Dec. 15, 1959   R. SENIOR, JR   2,917,569
CABLE SPLICE
Filed March 29, 1957

INVENTOR.
Robert Senior, Jr.
BY

ATTYS

United States Patent Office 2,917,569
Patented Dec. 15, 1959

2,917,569

CABLE SPLICE

Robert Senior, Jr., Cincinnati, Ohio, assignor to Empire Products, Incorporated, Cincinnati, Ohio, a corporation of Ohio Application March 29, 1957, Serial No. 649,554

11 Claims. (Cl. 174—84)

This invention relates generally to cable splicing and pertains more particularly to an improved solderless form of splicing cable ends together and in association therewith, protective covering means for effectively insulating the splice.

There are many different types of splicing arrangements presently on the market and many others not at present commercially available but which form the body of the prior art in relation to this field of endeavor. Many of these splicing assemblies are of special application but as far as is known, no provision has been made for a splice assembly particularly useful in joining rather heavy cables together and in so doing in an efficient and economical manner while at the same time permitting the spliced ends to be effectively sealed or insulated and hence remove some of the possibility of short circuiting due to water or other contamination.

It is, therefore, an important object of this invention to provide a device of the character described particularly adapted and useful in connection with joining rather heavy cable ends together and in doing so rapidly and economically and wherein the resultant splice is characterized by being well insulated and extremely waterproof and in all respects protected so as to insure not only good electrical contact but also long life.

Another object of this invention resides in the provision of an improved form of connecting tube which is readily deformable so that the material from which it is made may be pressed into the cable body which is inserted into the tube so as to at once firmly grip the same and serve as a connecting means and to assure good electrical conductivity.

Another object of this invention is to provide an improved splice assembly of the character described wherein the deformable tube is utilized in conjunction with a primary insulating element in the form of a split sleeve having protuberances thereon projectable into the depressions in the tube formed during a crimping or connecting operation and whereby such sleeve is securely anchored in place for the reception of an outer insulating sleeve.

A further object of this invention is to provide an improved form of splicing tube incorporating a centrally disposed inwardly deformed portion which serves as abutment means for the ends of cables to be joined so as to position the same within the tube and wherein such depression is also cooperable with a rib on an overlying primary insulating sleeve, serving to locate and anchor the same in place around the tube.

A further object of this invention resides in the provision of a splicing assembly in conformity with the preceding object wherein the tube is also deformed in opposite end portions thereof and in diametrically opposed relationship so as to receive therein protuberances on the inner face of the primary insulating sleeve, serving to anchor the same in place for the subsequent reception of an outer insulating sleeve and whereby the completed splice is smooth and uniform.

Another object of this invention resides in the provision of a soft copper connector tube open at both ends for the reception therein of joinable ends of cables with such tube being readily deformable so as to permit crimping of the same against the cable ends therewithin so as to at once securely lock and hold them in place and to establish a good electrical connection with the cables.

With the above and other objects in view, the invention consists in the construction and novel combination and arrangement of parts hereinafter fully described, illustrated in the accompanying drawing and pointed out in the claims hereto appended, it being understood that various changes in the form, proportions, and minor details of construction, within the scope of the claims, may be resorted to without departing from the spirit or sacrificing any of the advantages of the invention.

Figure 1:
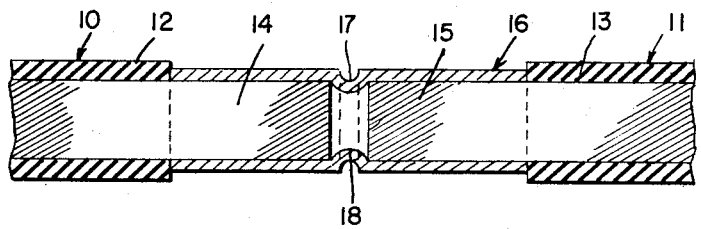
Fig. 1 is a sectional view showing the connector tube associated with a pair of cable ends and illustrating the initial step in forming a splice in accordance with this invention.

Referring at this time most particularly to Fig. 1, reference numerals 10 and 11 indicate generally a pair of cable ends which are desired to be connected and for this purpose, the outer insulating layer or layers 12 and 13 thereof have been stripped back as shown so as to expose the free end portions 14 and 15 of these cables. In the specific example shown, the cable core or current conducting portion thereof consists of multi-stranded braids of copper or the like wire in which the individual strands are of rather fine form.

The basic element for the connector or splice assembly is the connector tube indicated generally by the reference character 16 and which is formed from relatively soft copper preferably in the form of a cylindrical tube open at both ends and having a circumferentially extending depressed or grooved portion 17 serving to inwardly deform the wire defining the tube to provide the inner rib 18 serving as abutment means to limit the innermost positions of the cable ends 14 and 15. In this respect, it is preferred that the connector tube 16 be constructed such that its inner diameter is substantially the same as or only slightly greater than the diameter of the cable cores 14 and 15 so as to relatively snugly receive the same therein. As will be readily appreciated, the bared ends 14 and 15 of the cables should not be of a length materially greater than the opposite end portions of the connector tube 16 which receive them so that when the cables are properly associated with the connector tube 16, the insulating covers 12 and 13 will abut or substantially abut the opposite ends of the connector tube, as is shown most clearly in Fig. 1.

Figure 2:
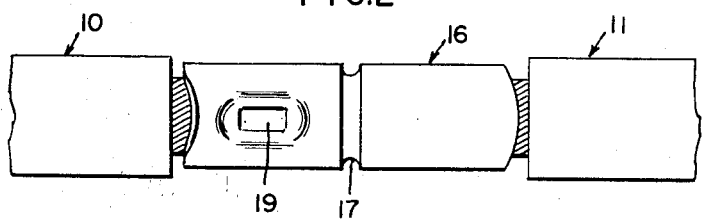
Fig. 2 is an elevational view of the assembly as shown in Fig. 1 but showing the condition of the connector tube subsequent to the crimping operation.
Figure 3:
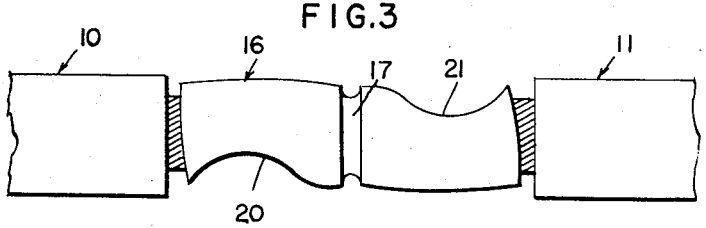
Fig. 3 is a top plan view of the assembly shown in Fig. 2 and further illustrating the finally crimped condition of the tube.

When the cable ends have been inserted within the connector tube, the tube is crimped inwardly by means of a suitable tool in the manner shown most clearly in Figs. 2 and 3. The crimping tool may take the form of a pair of pliers having one jaw provided with a concave inner face for receiving one side of the connector tube and with the opposite jaw having a nose which will press into the tube and deform the same toward the opposite side thereof as is indicated by the reference character 19 in Fig. 2. The opposite end of the tube is similarly crimped but in diametrically opposed relationship, see particularly Fig. 3, wherein the connector tube 16 will be seen to be deformed in the portions 20 and 21 thereof as a result of the crimping operations. The crimping serves a two-fold purpose. First, to firmly anchor the cable to the tube and, secondly, to achieve a good electrical connection between the tube and the cables so that the splice will be characterized by little current loss.

Figure 4:
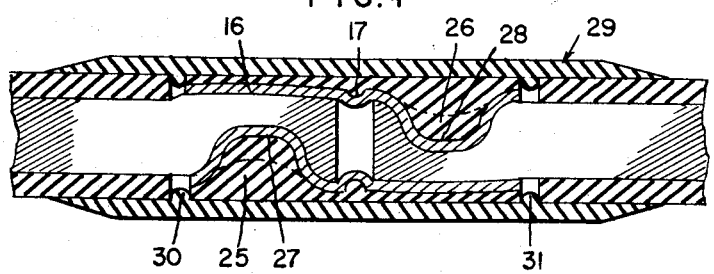
Fig. 4 is an enlarged sectional view taken through a completed splice and illustrating the crimping of the tube, the primary or first insulating sleeve and the outer insulating sleeve and their relative relationships with each other.
Figure 5:
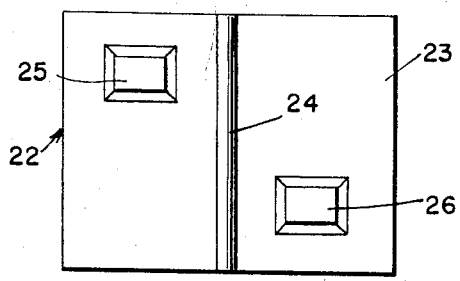
Fig. 5 is a plan view of the primary insulating sleeve and showing the inner face of the same as it appears in flattened condition.

After the crimping operations, the split primary insulating sleeve indicated generally by the reference character 22 in Fig. 5 is applied in surrounding relationship to the connector tube. The sleeve 22 is provided with a smooth outer face, whereas the inner face 23 thereof has a transversely extending rib 24 and diametrically opposed protuberances 25 and 26 which, when the sleeve is wrapped about the connector tube, are received within the depressions 27 and 28 formed by the crimping operations and which serve to securely anchor the split sleeve in surrounding, insulating relationship to the connector tube. To enhance the locking action between the split sleeve and the tube, the aforementioned transverse rib 24 is received within the groove 17 in the connector sleeve. It is to be appreciated that the split sleeve is normally in generally tubular shape and is formed of rubber-like material so as to be readily deformable to be spread open to embrace the connector tube and ultimately assume the position shown in Fig. 4.

An outer insulating sleeve, of rubber or rubber-like material, indicated generally by the reference character 29 in Fig. 4 forms the outer covering for the splice and extends beyond the opposite ends of the inner or primary sleeve 22 and in overlapping relationship at opposite ends thereof with the insulated layers for the cables. The outer sleeve may, like the inner sleeve 22, be split so as to be applied easily but it is preferred that the outer tube be of complete sleeve-like form and in this respect, it is initially applied over one of the separated cable ends before the splice is made and shoved back on the insulating portion of the cable out of the way until the splice is completed and the inner or primary sleeve is applied, whereafter the outer sleeve is pushed along into covering relationship as is shown in Fig. 4.

It is to be noted, from Fig. 4, that the primary sleeve 22 is substantially co-extensive in length with the connector tube so that it completely encompasses the same. It is also to be noted that in the process of crimping, the insulating layers 12 and 13 of the cables 10 and 11 will be pushed back or separated somewhat from the opposite ends of the connector tube and to fill the gaps produced thereby, the outer sleeve 29 is provided adjacent its opposite ends with the circumferentially extending inner ribs 30 and 31 which are spaced apart a distance slightly greater than the length of the connector tube and the primary or inner split sleeve, thus positioning them, when the outer sleeve is in place, within the channels or grooves provided between the opposite ends of the connector tube and the adjacent insulating portions of the cables 10 and 11.

To complete the splice, the opposite ends of the outer sleeve 29 and adjacent portions of the cable insulation may be wrapped with rubber tape and the entire assembly inserted within a suitable vulcanizing tool to vulcanize and sealingly join the opposite ends of the outer sleeve 29 with the cable insulation, whereby the splice is rendered waterproof and completely sealed.

By utilizing the primary or inner insulating sleeve which has its inner surface shaped to conform to the outer surface of the connecting tube 16 after the same has been crimped to complete the connection between the cable ends and which inner sleeve is provided with a smooth outer surface, there are no voids or pockets in the splice region which would permit the outer sleeve to be depressed thereinto and thus subject the same to the possibility of breakage or failure. The outer sleeve fits tightly upon the inner sleeve and the adjacent cable and portions and since the inner sleeve fills all the voids or pockets in the connecting tube, the outer sleeve is not subjected to bending or flexing even under conditions of very hard use and will thus retain its sealing relationship to the splice.

I claim:

1. A cable splice comprising a pair of insulated cable members having bared end portions, a deformable metallic connector tube receiving said bared ends of the cables and having opposite end portions projecting into and clampingly engaging said bared cable ends to interconnect the same and establish electrical continuity therethrough, a longitudinally split inner sleeve member wrapped about said connector tube and having protuberances on its inner surface projecting into surface depressions in said connector tube, an outer sleeve surrounding said inner sleeve and overlapping at opposite ends the insulated portions of said cables whereby to sealingly encompass the connector tube, the bared ends of the cables and the inner sleeve.

2. In a cable splice as defined in claim 1 wherein said connector tube is provided with inwardly projecting pockets serving to clampingly engage and interconnect said bared cable ends, such pockets being disposed on opposite ends of said connector tube and in diametrical relation to each other, said protuberances on the inner sleeve projecting into said pockets and the inner sleeve being coextensive in length with said connector tube.

3. In a cable splice as defined in claim 2 wherein said connector tube is provided with a circumferentially extending depression intermediate its ends providing an inwardly projecting stop shoulder to limit insertion of the bared cable ends thereinto, and said inner sleeve having a transverse rib on its inner surface received within said depression.

4. In a splice as defined in claim 1 wherein said connector tube and inner sleeve are coextensive in length and are spaced slightly from the adjacent insulated portions of the cables, said outer sleeve having a pair of circumferential ribs on its inner surface disposed in spaced apart relation slightly greater than the length of said inner sleeve and said connector tube to be received within the gaps between the opposite ends of the connector tube and the insulated cables.

5. A cable splicing assembly comprising a deformable metallic connector tube adapted to receive in the opposite ends thereof bared ends of cables to be spliced, a longitudinally split inner sleeve member for embracingly covering said tube and having a smooth outer surface, and an outer sleeve for surrounding said inner sleeve and tube and being of a length greater than either so as to overlap insulated end portions of cables connected by the splice assembly, said split sleeve being provided with protuberances on its inner surface for reception within crimp pockets in said deformable tube.

6. A cable splicing assembly comprising a deformable metallic connector tube adapted to receive in the opposite ends thereof bared ends of cables to be spliced, a longitudinally split inner sleeve member for embracingly covering said tube and having a smooth outer surface, and an outer sleeve for surrounding said inner sleeve and tube and being of a length greater than either so as to overlap insulated end portions of cables connected by the splice assembly, said tube and said inner sleeve being coextensive in length, and said outer sleeve having a pair of circumferential ribs on its inner surface spaced apart a distance slightly greater than the length of said tube and said inner sleeve so as to interlockingly engage thereover.

7. A cable splicing assembly comprising a deformable metallic connector tube adapted to receive in the opposite ends thereof bared ends of cables to be spliced, a longitudinally split inner sleeve member for embracingly covering said tube and having a smooth outer surface, and an outer sleeve for surrounding said inner sleeve and tube and being of a length greater than either so as to overlap insulated end portions of cables connected by the splice assembly, said tube being provided with an intermediate, circumferentially extending depression providing an inwardly projecting stop shoulder on its inner surface, said split inner sleeve having a transverse rib on its inner surface for reception within said depression and a pair of diametrically related inner surface protuberances adjacent its ends for reception within crimp pockets in said tube, said tube and inner sleeve being coextensive in length, and said outer sleeve having a pair of circumferential ribs on its inner surface spaced apart a distance slightly greater than the length of said tube and said inner sleeve so as to interlockingly engage thereover.

8. A cable splicing assembly comprising a deformable metallic connector tube, a bared end portion of a cable received in each end portion of the tube, said tube having crimp pockets formed therein securing the tube to the cable ends, an inner sleeve member surrounding said tube and having preformed protuberances on the inner surface thereof received in said crimp pockets, and an outer sleeve surrounding said inner sleeve and tube and being of a length greater than either so as to overlap insulated end portions of cables connected by the splice assembly.

9. In an assembly as defined in claim 8, wherein said tube and said inner sleeve are co-extensive in length, said outer sleeve having a pair of circumferential ribs on its inner surface spaced apart a distance slightly greater than the length of said tube and said inner sleeve so as to interlockingly engage thereover.

10. In an assembly as defined in claim 9, wherein said tube is provided with an intermediate circumferentially extending depression providing an inwardly projecting stop shoulder, and said inner sleeve having a transverse rib on its inner surface for reception within said depression.

11. A cable splice comprising a pair of insulated cable members having bared end portions, a deformable metallic connector tube receiving said bared ends of the cables for interconnecting the bared ends and establishing electrical continuity therebetween, an inner sleeve wrapped about said connector tube, and an outer sleeve surrounding said inner sleeve and overlapping the opposite ends of the insulated portions of said cables, and sealing means engaged with at least one end portion of said outer sleeve and the adjacent insulated portion of the cable whereby a fluid-tight seal is provided between said outer sleeve and the cable, said splice including sealing means engaged with the opposite end portion of said outer sleeve and the adjacent portion of the cable whereby the inner sleeve, the connector tube and the bared ends of the cables are provided with a fluid-tight seal, said connector tube having crimp pockets formed in opposite end portions thereof and projecting into and clampingly engaging said bared cable ends, said inner sleeve having protuberances on its inner surface disposed within said crimp pockets, said outer sleeve having a pair of circumferential ribs on its inner surface spaced apart a distance slightly greater than the length of said tube and said inner sleeve so as to interlockingly engage thereover.

References Cited in the file of this patent

UNITED STATES PATENTS

| 2,173,668 | Smith | Sept. 19, 1939 |
| 2,259,261 | Miller et al. | Oct. 14, 1941 |

FOREIGN PATENTS

| 1,006,070 | France | Jan. 9, 1953 |

OTHER REFERENCES

Ser. No. 269,478, H. Jacobs (A.P.C.), published May 18, 1943.